United States Patent
Corry et al.

(10) Patent No.: US 8,250,155 B2
(45) Date of Patent: Aug. 21, 2012

(54) SYSTEM AND METHOD FOR AUTOGENERATED EMAIL FOLLOW-UP

(75) Inventors: Kevin Corry, Pflugerville, TX (US); Mark A. Peloquin, Austin, TX (US); Steven Pratt, Leander, TX (US); Santhosh Rao, Austin, TX (US); Karl M. Rister, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 12/120,292

(22) Filed: Aug. 26, 2008

(65) Prior Publication Data

US 2009/0287776 A1 Nov. 19, 2009

(51) Int. Cl.
G06F 15/16 (2006.01)

(52) U.S. Cl. .......................... 709/206; 709/207; 709/203

(58) Field of Classification Search .......................... None
See application file for complete search history.

(56) References Cited

U.S. PATENT DOCUMENTS

| | | | |
|---|---|---|---|
| 6,108,688 A * | 8/2000 | Nielsen | 709/206 |
| 6,175,859 B1 | 1/2001 | Mohler | |
| 6,249,807 B1 | 6/2001 | Shaw et al. | |
| 6,272,532 B1 | 8/2001 | Feinleib | |
| 6,424,995 B1 * | 7/2002 | Shuman | 709/206 |
| 6,732,103 B1 | 5/2004 | Strick et al. | |
| 6,854,007 B1 | 2/2005 | Hammond | |
| 7,359,947 B2 * | 4/2008 | Kelley et al. | 709/206 |
| 7,509,385 B1 * | 3/2009 | Rittmeyer et al. | 709/206 |
| 7,603,420 B2 * | 10/2009 | Doan et al. | 709/206 |
| 7,761,521 B2 * | 7/2010 | Kubala et al. | 709/206 |
| 2004/0044583 A1 | 3/2004 | Thibault | |
| 2006/0168067 A1 * | 7/2006 | Carlson et al. | 709/206 |
| 2006/0277263 A1 * | 12/2006 | Daniels et al. | 709/206 |
| 2007/0271345 A1 * | 11/2007 | Callanan et al. | 709/206 |
| 2010/0169888 A1 * | 7/2010 | Hare et al. | 718/102 |

* cited by examiner

*Primary Examiner* — Thu Nguyen
*Assistant Examiner* — Angela Widhalm
(74) *Attorney, Agent, or Firm* — Yudell Isidore Ng Russell, PLLC

(57) ABSTRACT

A system and method for transmitting an electronic mail message to one or more intended recipients, which allows the user to designate that an electronic mail message contains a request for information which requires a reply from the one or more intended recipients, monitors electronic mail messages incoming to the sender to detect whether a reply has been received within the response period, and upon receiving a reply from any of the one or more intended recipients, presents the reply to the sender with one or more user-selectable icons which allow the sender to accept the reply as sufficient or request more information from the one or more intended recipients in response to selection of a user-selectable icon.

33 Claims, 4 Drawing Sheets

SYSTEM AND METHOD FOR AUTOGENERATED EMAIL FOLLOW-UP

TECHNICAL FIELD

The present invention relates in general to communicating via electronic mail messages, in particular to enhancing the reliability of communication, and more particularly to managing electronic mail messages.

BACKGROUND OF THE INVENTION

Electronically-communicated messages ("electronic mail messages") such as email, paging messages, and voicemail have become increasingly popular and pervasive in recent years. For the creator of an electronic mail message, the ability to send the message to one or more recipients provides for quick and efficient communication. Such communication via electronic mail messages has become common in both business and personal settings. While the initial distribution of electronic mail messages by a sender is quick and convenient, ensuring that an electronic mail message is responded to by a recipient within a certain time frame is not convenient.

A few transmission systems allow the sender to request notification when an electronic mail message is received by a recipient and when it has been accessed (e.g., opened by an application program with which the recipient can review the message) by the recipient. In some such systems, the recipient's system will provide to the sender's system a delivery receipt or a review receipt to provide notification when delivery or review of an electronic mail message has occurred. Thus, if a review receipt has not yet been received, then the recipient may not have reviewed the electronic mail message. However, the sender has no automatic means of prompting the recipient to reply to an electronic mail message for which the sender requires a response, and the sender has no means for tracking that such a response has been received. Therefore, a need exists for an automatic means of prompting a recipient to reply to an electronic mail message that requires a response, and tracking that such a response has been received.

SUMMARY OF THE INVENTION

It is therefore one object of the present invention to provide an improved method and system of communicating via electronic mail messages, in particular to enhancing the reliability of communication, and more particularly to managing electronic mail messages.

The foregoing objects are achieved as now described: a system and method are disclosed for transmitting an electronic mail message to one or more intended recipients, which allows the user to set a flag to designate that an electronic mail message contains a request for information which requires a reply from the one or more intended recipients, monitors electronic mail messages incoming to the sender to detect whether a reply has been received within the response period, and upon receiving a reply from any of the one or more intended recipients, presents the reply to the sender with one or more user-selectable icons which allow the sender to accept the reply as sufficient or request more information from the one or more intended recipients in response to selection of a user-selectable icon.

At the time of sending an electronic mail message, a sender can "tag" the electronic mail message as requiring a response. The sender can also set a response time to designate how long the sender is willing to wait for a response (for example, 2 days). If a response to that electronic mail message is not received by the sender's electronic mail message program within the time period allowed, the sender is prompted to take some further action. Such further action can include: sending an automatically-filled electronic mail message reminder to the recipient, resetting the response period, sending the electronic mail message to another person, or terminating the request for further information. If a response to that electronic mail message is received by the sender's electronic mail message program within the time period allowed, the sender is prompted to take some further action by requesting more information or terminating the request for further information by sending an electronic mail message to the recipient that the sender has terminated the request for more information. Checking whether the response time has lapsed can be handled by calendar or to-do list functions already built into an electronic mail message program.

The system sends an electronic message to designated recipients, and tags the message as requiring a response, to ensure that each message is handled within a specified period of time. In addition, the system automatically performs specified activities if a response is not received by the recipient within the specified time period. The sender can specify that if a response is not received from the recipient within the specified period of time, an auto-filled electronic mail message reminder may be sent to the recipient, and the sender will have an option to reset the response period and send the electronic mail message to another recipient. When an electronic mail message is opened by the recipient, it is checked for a header tag or the subject line, and sender fields are compared for whether they match a setting for which a tag requiring response has been designated. A button or other user-selectable icon is presented which allows the sender to accept the recipient's response, if the information in the electronic mail message is sufficient to satisfy the request for information for which the tag was set.

DETAILED DESCRIPTION OF THE INVENTION

The illustrative embodiments contained herein provide a method, system and computer program product for transmitting an electronic mail message to one or more intended recipients, which allow the user to set a flag to designate that an electronic mail message contains a request for information which requires a reply from the one or more intended recipients, monitor electronic mail messages incoming to the sender to detect whether a reply has been received within the response period, and upon receiving a reply from any of the one or more intended recipients, present the reply to the sender with one or more user-selectable icons which allow the sender to request more information from the one or more intended recipients in response to selection of said user-selectable icon.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is therefore not to be taken in a limiting sense, and the scope of the present invention is defined only by the appended claims. Within the descriptions of the figures, the specific numerals assigned to the elements are provided solely to aid in the description and are not meant to imply any limitations (structural or functional) on the invention.

It is understood that the use of specific component, device and/or parameter names are for example only and are not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

Figure 1:
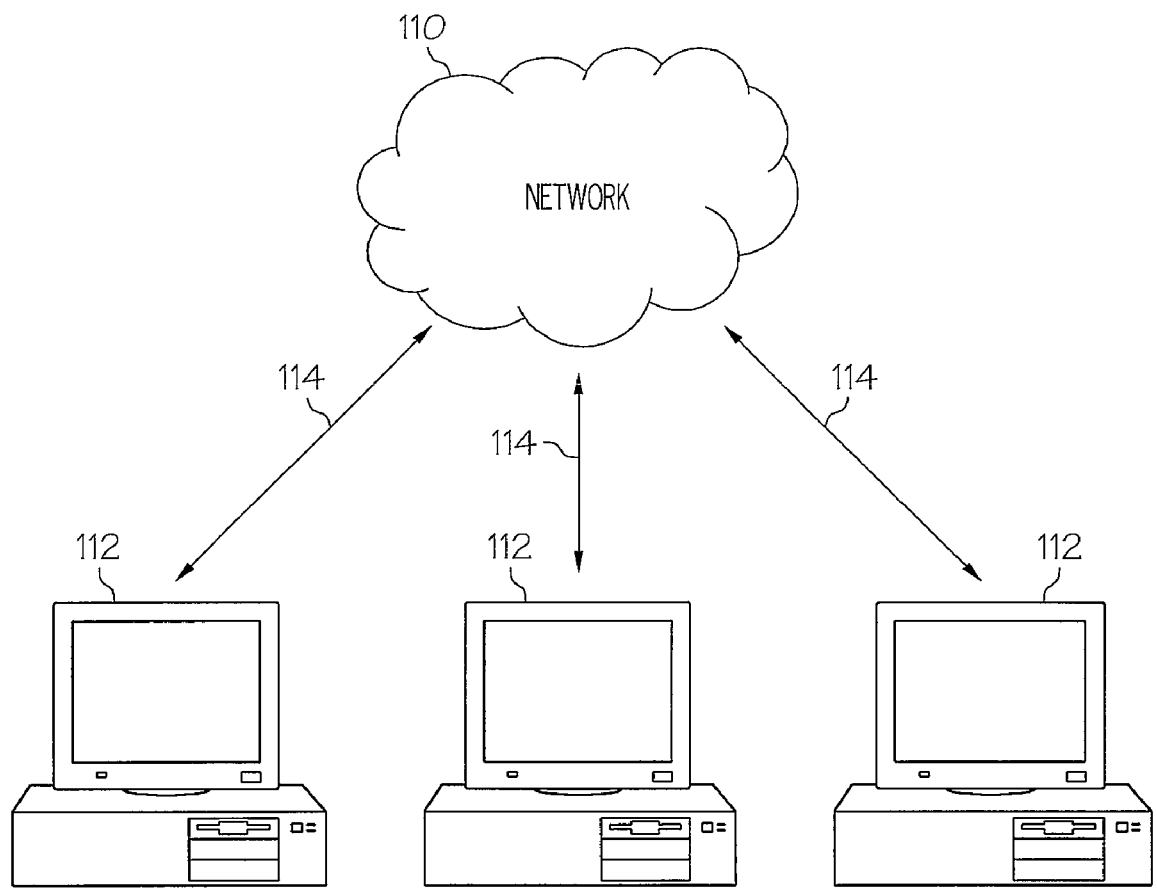
FIG. 1 is a diagram of a network of computers with the ability to send and receive electronic mail messages in which the method and system of the present invention may be practiced.

With reference now to the figures, and in particular to FIG. 1, there is illustrated a network 110 having a plurality of network-connected computers 112, each connected to network 110 and capable of sending and receiving electronic mail messages 114. Several distributed computer systems may exist in network 110, including computer 112. In one embodiment, computer 112 may be a laptop computer. In another embodiment, computer 112 may be a PDA or any other device used to transmit electronic mail messages. As depicted, network 110 may send and receive electronic mail messages to and from computer 112. Any conventional electronic mail program may be utilized to fulfill the sending and receiving of electronic mail messages on a computer, when modified to function as described herein.

Figure 2:
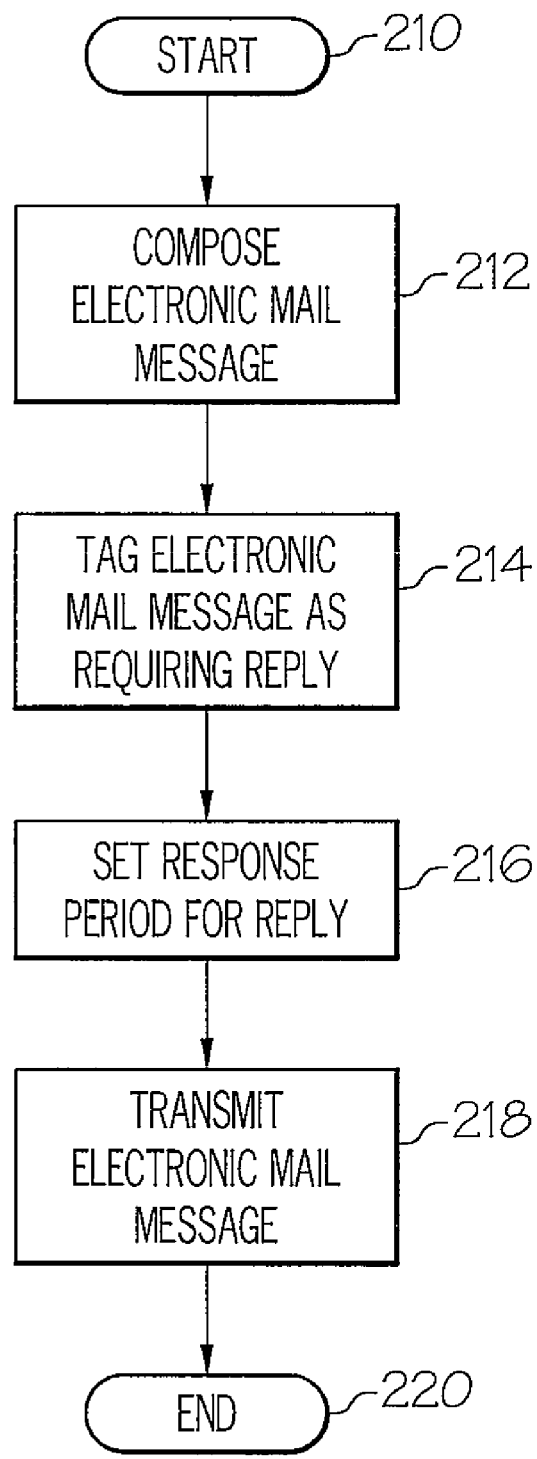
FIG. 2 is a logic flow chart of the process of transmitting an electronic mail message that has been tagged by the sender as requiring a response from the recipient in accordance with the method and system of the present invention.

Referring now to FIG. 2, there is depicted a logic flow chart of the process of transmitting an electronic mail message that has been tagged by the sender as requiring a response from the recipient. The process comprises the steps of: composing an electronic mail message to be sent to one or more recipients, receiving a tag for an electronic mail message that requires a response from a recipient, setting a response period for a reply, and transmitting the electronic mail message to be sent to each recipient. In the illustrated embodiment, the electronic mail messages being sent are electronic mail messages which are to be read and responded to by the recipients, and each recipient can have different response period information.

The transmission process begins in step 210, which depicts the process moving forward to step 212, which illustrates the sender composing an electronic mail message to one or more recipients. The process continues at step 214, which depicts that the sender may tag an electronic mail message as requiring a response from a recipient. Step 216, illustrates that the sender may set a response period for a reply from each recipient. The sender inputs the response period via a text field suggested upon the sender's selection of a user-selectable icon in which the sender tags the electronic mail message as requiring a response from the recipient. The sender can specify options that indicate how and to whom the original and further messages are to be sent. The sender can also specify activity to occur after response to the message by the recipient, such as sending a follow-up message or executing a function after a specified period of time has elapsed. In an alternate embodiment, the system could calculate or use default information for some of the message tracking information. For example, historical data could indicate that responses to messages for a particular recipient often go without ever receiving a reply, so a short Response Period should be used. Similarly, historical data could indicate that another recipient often needs multiple reminder messages before the original message is responded to, so the electronic mail message options could be automatically selected to reflect this information. The sender transmits the electronic message, which is depicted in step 218, and the process ends as illustrated in step 220.

Figure 3:
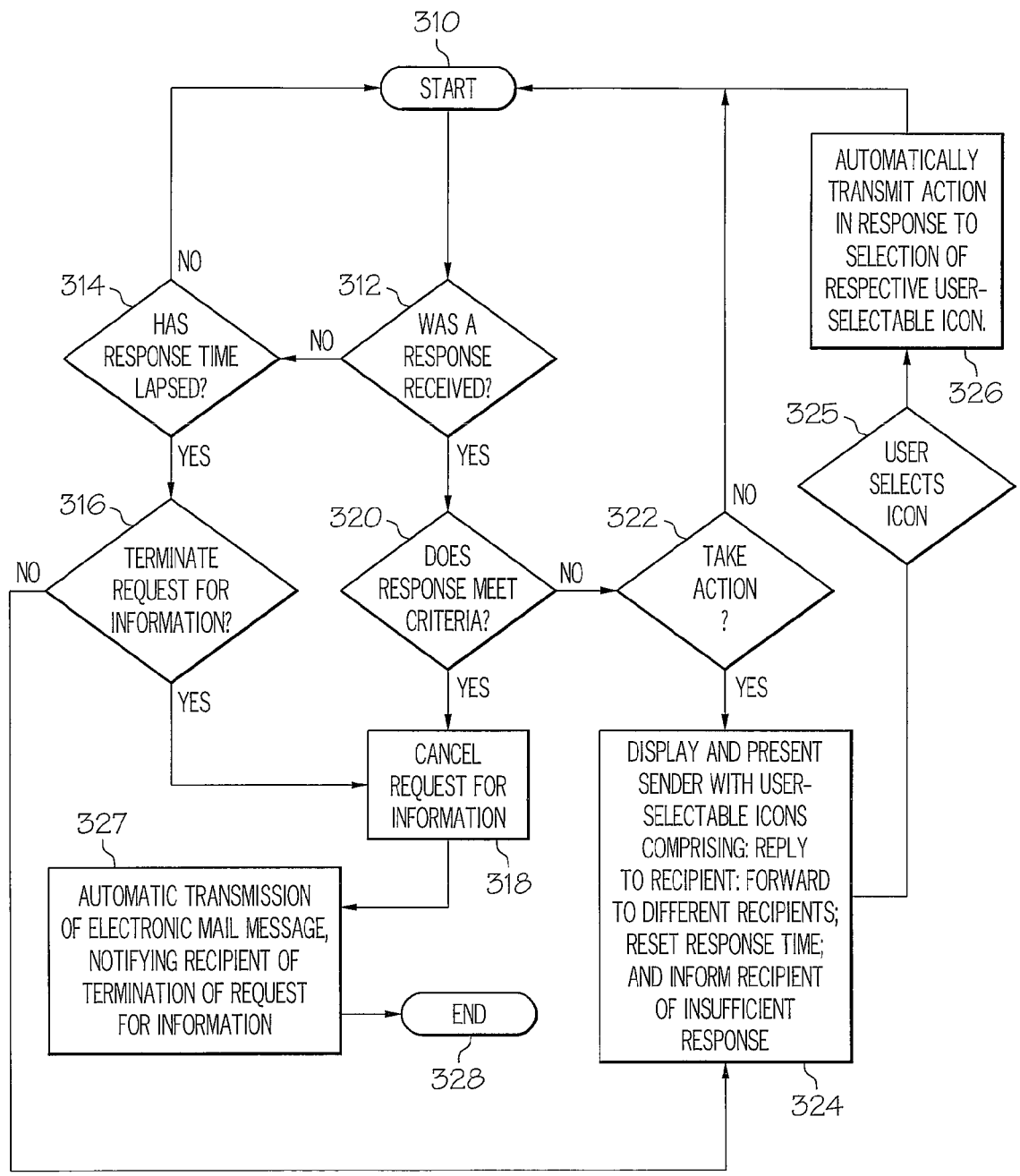
FIG. 3 is a logic flow charts of the process of automatically creating user-selectable icons that the sender can select in response to an electronic mail message that has been tagged by the sender as requiring a response from the recipient in accordance with the method and system of the present invention.

With reference now to FIG. 3, there is illustrated a logic flow chart of the process of automatically creating user-selectable icons that the sender can select in response to an electronic mail message that has been tagged by the sender as requiring a response from the recipient. This process begins at step 310 and continues to step 312, which depicts whether a reply has been received. If a reply has not been received, then the process continues to step 314, which illustrates a decision as to whether the response period has lapsed. If the response period has not lapsed, then the process continues to step 310 in an iterative process until either a response has been received or the response period has lapsed.

If no response has been received but the response period has lapsed as depicted in step 314, then the process continues to step 316, which depicts whether the sender has terminated the request for information from the recipient. If the sender chooses to terminate the request for information, the process proceeds to step 318, which illustrates the cancellation of the request for information. The process then continues to step 327, which illustrates the automatic transmission of an electronic mail message from the sender to the recipient that informs the recipient that the request for information has been terminated in response to the sender's selection of the icon for request termination, and then the process continues to the end of the process as depicted at step 328. If the sender choose to not terminate the request for information as illustrated in step 316, the process continues to step 324, which depicts a display and presentation to the sender of user-selectable icons to perform an action, with the options for actions to perform comprising: reply to the recipient, forward to other recipients, reset the response time, or inform the recipient that the recipient's response was insufficient. The process continues to step 325, which illustrates the user selecting a user-selectable icon before the process proceeds to step 326, which illustrates the automatic transmission of a request to perform an action in response to the selection by the sender of a user-selectable icon, which restarts the process as depicted at step 310.

If a response has been received as illustrated at step 312, the process continues to step 320, which illustrates whether a sufficient reply has been received by the sender. If the response meets the criteria set by the sender, then the process continues to step 318, as described above. If the response does not meet the criteria set by the sender, then the process proceeds to step 322, which illustrates the user's decision to take further action. If the sender does not decide to take further action, then the process proceeds to the start of the process as depicted in step 310. If the sender does decide to take further action, the process continues to step 324, as described above.

If the sender has not received a sufficient response or has not terminated the request for information, the process proceeds to step 324, which depicts an option for a user-selectable icon to indicate that an insufficient response has been received, which the sender may select. The process continues to step 325, which illustrates the display of a user-selectable icon with a field in which the sender may reset the response time or add new recipients to the request for information. The process proceeds to step 326, which depicts the automatic transmission of an electronic mail message from the sender in response to the sender's selection of a user-selectable icon as illustrated in step 324.

If the sender has received a sufficient response or has terminated the request for information, the process proceeds to step 318, which depicts a user-selectable icon to terminate the request for information, which the sender may select. The process then continues to step 327, which illustrates the automatic transmission of an electronic mail message from the sender to the recipient that informs the recipient that the request for information has been terminated in response to the sender's selection of the icon for request termination, followed by the termination of the process as depicted in step 328.

Figure 4:
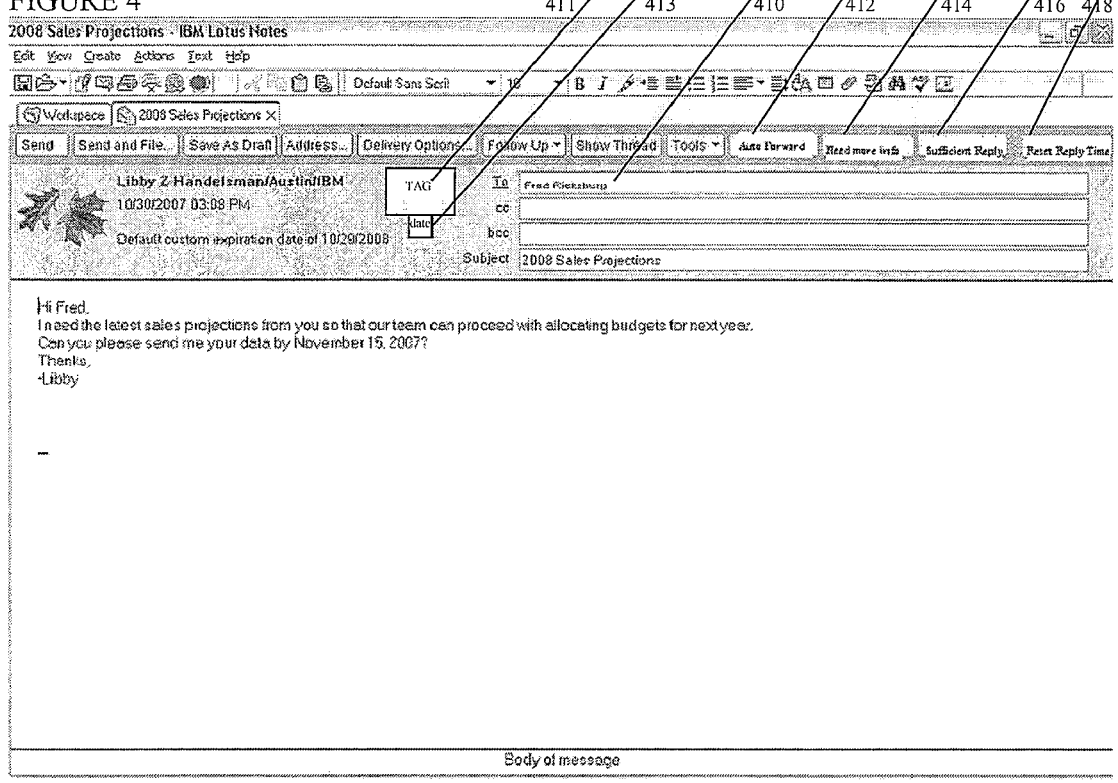
FIG. 4 is a pictorial representation of a graphical user interface of user-selectable icons that the sender may select in response to an electronic mail message that has been tagged by the sender as requiring a response from the recipient, according to one embodiment of the invention.

Referring now to FIG. 4, there is depicted a pictorial representation of a graphical user interface of user-selectable icons that the sender can select in response to an electronic mail message that has been tagged by the sender as requiring a response from the recipient, according to one embodiment of the invention. In this graphical user interface, there is illustrated a recipient 410, a field which can be filled in with one or more recipients of an electronic mail message, and to whom the electronic mail message is transmitted upon the sending of an electronic mail message. The sender of the electronic mail message can identify the electronic mail message as requiring a response from the recipient, which the sender can identify by selecting a user-selectable icon 411, which tags the electronic mail message as requiring a response from the recipient. This user-selectable icon produces a field 413 for the sender to input the response period during which the sender would like to receive a response from the recipient. The date which the sender inputs can be different for each recipient.

After it is determined that the sender has received a response from the recipient, user-selectable icons are displayed for an automatically formatted response to the recipient. These user-selectable icons are presented to the user in the form of an electronic mail message, and the user-selectable icons are comprised of an icon with which to: indicate that the response from the recipient is not sufficient; indicate that the response from the recipient is sufficient by terminating the request for information; reset the response time; and forward the electronic mail message to a different recipient. The sender can indicate that the response from the recipient is not sufficient by selecting a "Need more information" icon 414. The sender can indicate that the response from the recipient is sufficient by selecting a "Sufficient response" icon 416. The sender can reset the response time by selecting a "Reset response time" icon 418. The sender can forward the electronic mail message to a different recipient by selecting an "Automatically forward" icon 412. If the sender selects any of these icons, and in particular "Sufficient response" icon 416, "Seed more information" icon 414, or "Automatically forward" icon 412, an electronic mail message is created wherein the recipient is automatically filled in and allows the sender to add other recipients, especially if the sender selects "Automatically forward" icon 412. The electronic mail message that is created as a result of selection of one of these icons is automatically filled in with a pre-scripted message that corresponds with the user-selectable icon that was selected.

In the flow charts above, one or more of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non-exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A computer-implemented method for managing electronic mail message responses, the method comprising:
   a data processing system transmitting an original electronic mail message originated by a sender to an intended recipient, wherein the original electronic mail message includes a request for information requiring a response from the intended recipient;
   the data processing system monitoring incoming electronic mail messages addressed to the sender to detect whether a reply electronic mail message replying to the original electronic mail message has been received;
   in response to an earliest of receipt of the reply electronic mail message, if any, and expiration of a response period beginning with transmission of the original electronic mail message, the data processing system automatically presenting to the sender the reply electronic mail message, if received in the response period, and a follow-up electronic mail message by the sender to the original electronic mail message, said follow-up electronic mail message including one or more user-selectable icons that enable the sender to choose by selection of one or more of the user-selectable icons from further actions including each of:
      replying to the reply electronic mail message of the intended recipient, if received; forwarding the reply electronic mail message, if received, to a different recipient; if no reply electronic mail message has been received, reminding the sender that the sender has not received an answer to the request for information from the intended recipient at conclusion of a subsequent response period if no reply electronic mail message is received in the subsequent response period; and if the reply electronic mail message is received in the response period, requesting more information than included in the reply electronic mail message from the intended recipient; and
   in response to selection of one or more of the user-selected icons, the data processing system performing one or more further actions indicated by the one or more selected user-selectable icons.

2. The method of claim 1, further comprising:
   establishing the response period during which said reply electronic mail message is due from the intended recipient in response to a user input;
   checking if said reply electronic mail message has been received from the intended recipient within the response period.

3. The method of claim 2, wherein the further actions include:
   extending the response period in response to user selection of one of the one or more user-selectable icons, when the reply electronic mail message is not received from the intended recipient within the response period.

4. The method of claim 2, wherein the further actions include:
   sending a reminder of the original electronic mail message to the intended recipient, when the reply electronic mail message is not received from the intended recipient within the response period.

5. The method of claim 2, wherein the further actions include:
   sending a copy of the original electronic mail message to a new recipient, when the reply electronic mail message is not received from the intended recipient within the response period.

6. The method of claim 2, wherein the intended recipient is one of multiple intended recipients specified in the original email message, the method further comprising:
   determining whether a reply electronic mail message has been received from any of the multiple intended recipients within the response period; and
   automatically resending the original electronic mail message to each of the multiple intended recipients, in response to determining that no reply electronic mail message has been received from any of the multiple intended recipients.

7. The method of claim 1, wherein the further actions include:
   indicating to the intended recipient acceptance of the reply electronic mail message as sufficient and canceling further monitoring of reply electronic mail messages responsive to the original electronic mail message.

8. A computer system for managing electronic mail message responses, the computer system comprising:
   a memory configured to store a plurality of electronic mail messages; and
   a processor coupled to the memory, wherein the processor executes program code to implement an electronic mail system by causing the computer system to perform:
      transmitting an original electronic mail message originated by a sender to an intended recipient, wherein the original electronic mail message includes a request for information requiring a response from the intended recipient;
      monitoring incoming electronic mail messages addressed to the sender to detect whether a reply electronic mail message replying to the original electronic mail message has been received; and
      in response to an earliest of receipt of the reply electronic mail message, if any, and expiration of a response period beginning with transmission of the original electronic mail message, automatically presenting to the sender the reply electronic mail message, if received in the response period, and a follow-up electronic mail message by the sender to the original electronic mail message, said follow-up electronic mail message including one or more user-selectable icons that enable the sender to choose by selection of one or more of the user-selectable icons from further actions including each of:
         replying to the reply electronic mail message of the intended recipient, if received; forwarding the reply electronic mail message, if received, to a different recipient; if no reply electronic mail message has been received, reminding the sender that the sender has not received an answer to the request for information from the intended recipient at conclusion of a subsequent response period if no reply electronic mail message is received in the subsequent response period; and if the reply electronic mail message is received in the response period, requesting more information than included in the reply electronic mail message from the intended recipient; and
      in response to selection of one or more of the user-selected icons, performing one or more further actions indicated by the one or more selected user-selectable icons.

9. The system of claim 8, wherein the program code further causes the computer system to perform:
  establishing the response period during which said reply electronic mail message is due from the intended recipient in response to a user input; and
  checking if said reply electronic mail message has been received from the intended recipient within the response period.

10. The computer system of claim 9, wherein the actions further include:
  extending the response period in response to user selection of one of the one or more user-selectable icons, when the reply electronic mail message is not received from the intended recipient within the response period.

11. The computer system of claim 9, wherein the actions further include:
  sending a reminder of the original electronic mail message to the intended recipient, when the reply electronic mail message is not received from the intended recipient within the response period.

12. The computer system of claim 9, wherein the actions further include:
  sending a copy of the original electronic mail message to a new recipient, when the reply electronic mail message is not received from the intended recipient within the response period.

13. The computer system of claim 9, wherein the intended recipient is one of multiple intended recipients specified in the original email message, and wherein the program code further causes the computer system to perform:
  determining whether a reply electronic mail message has been received from any of the multiple intended recipients within the response period; and
  automatically resending the original electronic mail message to each of the multiple intended recipients, in response to determining that no reply electronic mail message has been received from any of the multiple intended recipients.

14. The computer system of claim 8, wherein the actions further include:
  indicating to the intended recipient acceptance of the reply electronic mail message as sufficient and canceling further monitoring of reply electronic mail messages responsive to the original electronic mail message.

15. A computer program product for managing electronic mail message responses, the computer program product comprising:
  a machine-readable storage medium; and
  program code, stored on the machine-readable storage medium that, when executed by a processor, causes an electronic mail system to perform:
    presenting a user interface for composing an original electronic mail message originated by a sender, wherein the original electronic mail message includes a request for information requiring a response from the intended recipient;
    transmitting the original electronic mail message to an intended recipient;
    monitoring incoming electronic mail messages addressed to the sender to detect whether a reply electronic mail message replying to the original electronic mail message has been received; and
    in response to an earliest of receipt of the reply electronic mail message, if any, and expiration of a response period beginning with transmission of the original electronic mail message, automatically presenting to the sender the reply electronic mail message, if received, and a follow-up electronic mail message by the sender to the original electronic mail message, said follow-up electronic mail message including one or more user-selectable icons that enable the sender to choose by selection of one or more of the user-selectable icons from further actions including each of:
      replying to the reply electronic mail message of the intended recipient, if received; forwarding the reply electronic mail message, if received, to a different recipient; if no reply electronic mail message has been received, reminding the sender that the sender has not received an answer to the request for information from the intended recipient at conclusion of a subsequent response period if no reply electronic mail message is received in the subsequent response period; and if the reply electronic mail message is received in the response period, requesting more information than included in the reply electronic mail message from the intended recipient; and
    in response to selection of one or more of the user-selected icons, performing one or more further actions indicated by the one or more selected user-selectable icons.

16. The computer program product of claim 15, wherein the program code further causes the electronic mail system to perform:
  establishing the response period during which said reply electronic mail message is due from the intended recipient in response to user input; and
  checking if said reply electronic mail message has been received from the intended recipient within the response period.

17. The computer program product of claim 16, wherein the actions further include:
  extending the response period in response to user selection of one of the one or more user-selectable icons, when the reply electronic mail message is not received from the intended recipient within the response period.

18. The computer program product of claim 16, wherein the actions further include:
  sending a reminder of the original electronic mail message to the intended recipient, when the reply electronic mail message is not received from the intended recipient within the response period.

19. The computer program product of claim 16, wherein the actions further include:
  sending a copy of the original electronic mail message to a new recipient, when the reply electronic mail message is not received from the intended recipient within the response period.

20. The computer program product of claim 16, the intended recipient is one of multiple intended recipients specified in the original email message, and wherein the program code further causes said electronic mail system to perform:
  determining whether a reply electronic mail message has been received from any of the multiple intended recipients within the response period; and
  automatically resending the original electronic mail message to each of the multiple intended recipients, in response to determining that no reply electronic mail message has been received from any of the multiple intended recipients.

21. The computer program product of claim 15, wherein the actions further include:

indicating to the intended recipient acceptance of the reply electronic mail message as sufficient and canceling further monitoring of reply electronic mail messages responsive to the original electronic mail message.

22. The method of claim 2, wherein establishing a response period comprises automatically establishing the response period based on historical response time data for the intended recipient.

23. The method of claim 1, and further comprising:
automatically populating a message field of the follow-up electronic mail message with a default text message among a plurality of default text messages in response to selection of one or more of the one or more user-selectable icons.

24. The method of claim 23, wherein the default text message includes a prompt for additional information responsive to the request for information.

25. The method of claim 1, wherein the presenting includes presenting the follow-up electronic mail message in absence of the reply electronic mail message.

26. The computer system of claim 9, wherein establishing a response period comprises automatically establishing the response period based on historical response time data for the intended recipient.

27. The computer system of claim 8, wherein the program code further causes the computer system to perform:
automatically populating a message field of the follow-up electronic mail message with a default text message among a plurality of default text messages in response to selection of one or more of the one or more user-selectable icons.

28. The computer system of claim 27, wherein the default text message includes a prompt for additional information responsive to the request for information.

29. The computer system of claim 8, wherein the presenting includes presenting the follow-up electronic mail message in absence of the reply electronic mail message.

30. The computer program product of claim 16, wherein establishing a response period comprises automatically establishing the response period based on historical response time data for the intended recipient.

31. The computer program product of claim 15, wherein the program code further causes the electronic mail system to perform:
automatically populating a message field of the follow-up electronic mail message with a default text message among a plurality of default text messages in response to selection of one or more of the one or more user-selectable icons.

32. The computer program product of claim 31, wherein the default text message includes a prompt for additional information responsive to the request for information.

33. The computer program product of claim 15, wherein the presenting includes presenting the follow-up electronic mail message in absence of the reply electronic mail message.

* * * * *